US008648689B2

(12) United States Patent
Hathaway et al.

(10) Patent No.: US 8,648,689 B2
(45) Date of Patent: Feb. 11, 2014

(54) METHOD AND SYSTEM FOR DETECTING DOOR STATE AND DOOR SENSOR FAILURES

(75) Inventors: Richard Reynolds Hathaway, Livonia, MI (US); Brian J Deurloo, Howell, MI (US); Christopher Lee Danks, Northville, MI (US); Mark Edward Zyskowski, Dearborn, MI (US); Jeffrey James Tumavitch, Livonia, MI (US); Todd Curtis Spaulding, Ann Arbor, MI (US); Charles C Poon, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 178 days.

(21) Appl. No.: 13/396,179

(22) Filed: Feb. 14, 2012

(65) Prior Publication Data
US 2013/0207773 A1    Aug. 15, 2013

(51) Int. Cl.
*G05B 23/02* (2006.01)

(52) U.S. Cl.
USPC ......... 340/3.43; 340/10.5; 340/438; 292/216; 70/237

(58) Field of Classification Search
USPC ............. 340/3.1, 3.43–3.44, 5.72, 10.1, 10.5, 340/438, 459, 540; 307/10.1–10.3; 292/216; 70/237
See application file for complete search history.

(56) References Cited

U.S. PATENT DOCUMENTS

| | | | | |
|---|---|---|---|---|
| 4,762,348 A * | 8/1988 | Matsumoto | .................... | 292/201 |
| 5,273,324 A * | 12/1993 | Kobayashi | .................... | 292/201 |
| 6,404,073 B1 * | 6/2002 | Chiang | ........................ | 307/10.1 |
| 7,156,218 B2 * | 1/2007 | Yamamoto | ................ | 192/219.4 |
| 7,171,293 B2 | 1/2007 | Ichikawa et al. | | |
| 2003/0182863 A1 | 10/2003 | Mejean et al. | | |
| 2003/0216817 A1 * | 11/2003 | Pudney | .......................... | 700/17 |
| 2004/0090122 A1 * | 5/2004 | Huber et al. | ................. | 307/10.2 |
| 2004/0124027 A1 * | 7/2004 | Aiyama et al. | ................ | 180/274 |
| 2004/0160126 A1 * | 8/2004 | Aoki et al. | ..................... | 307/10.2 |
| 2005/0001437 A1 * | 1/2005 | Brose | ............................ | 292/216 |
| 2005/0127685 A1 * | 6/2005 | Spurr et al. | .................... | 292/201 |
| 2006/0001275 A1 * | 1/2006 | Plett et al. | ...................... | 292/216 |
| 2006/0055178 A1 * | 3/2006 | Graute | ........................... | 292/216 |
| 2008/0012354 A1 * | 1/2008 | Chevalier | ...................... | 292/216 |
| 2008/0143139 A1 * | 6/2008 | Bauer et al. | ................ | 296/146.1 |
| 2008/0173121 A1 | 7/2008 | Kimura et al. | | |
| 2008/0242506 A1 | 10/2008 | Hori et al. | | |
| 2009/0090148 A1 * | 4/2009 | Kollin et al. | ..................... | 70/263 |
| 2009/0241617 A1 * | 10/2009 | Takahashi et al. | .............. | 70/257 |
| 2009/0256677 A1 * | 10/2009 | Hein et al. | .................... | 340/5.72 |
| 2009/0326767 A1 | 12/2009 | Kamada et al. | | |

(Continued)

*Primary Examiner* — Hai Phan
*Assistant Examiner* — Orlando Bousono
(74) *Attorney, Agent, or Firm* — Diederiks & Whitelaw, PLC (57) ABSTRACT

A system includes a controller that executes a method for determining failure of the door latch sensor using both the door latch sensor and a door lock sensor. If the door latch sensor is faulty, the controller adjusts an automatic feature of the vehicle based on a door lock signal instead of a door state signal. The controller is also configured to mark the door latch signal as faulty if the door latch system is not functioning properly by using a fault counter that tracks the door lock sensor.

17 Claims, 6 Drawing Sheets

(56) References Cited

U.S. PATENT DOCUMENTS

| | | |
|---|---|---|
| 2010/0026014 A1* | 2/2010 | Machida et al. ............. 292/216 |
| 2010/0140963 A1* | 6/2010 | Graute .......................... 292/195 |
| 2010/0168956 A1 | 7/2010 | Ueno |
| 2010/0303253 A1 | 12/2010 | Sakai et al. |
| 2011/0018534 A1 | 1/2011 | Peukert et al. |
| 2011/0054735 A1 | 3/2011 | Kamiya |
| 2011/0068895 A1 | 3/2011 | Gee et al. |
| 2011/0098881 A1 | 4/2011 | Tsutsumi et al. |
| 2011/0112732 A1 | 5/2011 | Ueno |

* cited by examiner

METHOD AND SYSTEM FOR DETECTING DOOR STATE AND DOOR SENSOR FAILURES

BACKGROUND OF THE INVENTION

1. Field of Invention

The present invention pertains to the field of sensors providing information to automatic transmission controllers for motor vehicles and, more particularly, to a method and system for detecting whether a door is open or closed and if a door sensor fails.

2. Background of the Invention

A traditional automatic transmission includes a control device employed to control the transmission of a motor vehicle. In particular, the transmission control device is used to select several ranges, such as Park wherein the transmission is locked to prevent the vehicle from moving, Neutral wherein the transmission allows the vehicle to be moved freely, such as when being towed, Reverse wherein the transmission allows the vehicle to move backwards, and one or more Drive ranges that enable forward motion of the vehicle. Usually, the transmission control device is in the form of a lever connected with a mechanical connection, such as a cable or a hydraulic line, to the transmission. Typically, the lever is also connected to an indicator. As the transmission control mechanism is moved from one range to another, the mechanical connection physically shifts the transmission to the selected setting and the indicator moves to show the driver which range has been selected. Even if the vehicle is turned off, the driver is able to determine the current transmission range from the indicator and, in some cases, to move the transmission control mechanism to Neutral if for example, the vehicle is to be towed.

The traditional automatic transmission utilizes multiple friction elements for automatic gear ratio shifting. Broadly speaking, these friction elements may be described as torque establishing elements, more commonly referred to as clutches or brakes. The friction elements function to establish power flow paths from an internal combustion engine to a set of vehicle traction wheels. During acceleration of the vehicle, the overall speed ratio, which is the ratio of a transmission input shaft speed to a transmission output shaft speed, is reduced during a ratio upshift as vehicle speed increases for a given engine throttle setting. A downshift to achieve a higher speed ratio occurs as an engine throttle setting increases for any given vehicle speed, or when the vehicle speed decreases as the engine throttle setting is decreased. Various planetary gear configurations are found in modern automatic transmissions. However, the basic principle of shift kinematics remains similar. Shifting an automatic transmission having multiple planetary gearsets is accompanied by applying and/or releasing friction elements to change speed and torque relationships by altering the torque path through the planetary gearsets. Friction elements are usually actuated either hydraulically or mechanically based on the position of the transmission control device.

In a shift-by-wire transmission arrangement, the mechanical connection between the transmission control device and the transmission is eliminated. Instead, the transmission control device transmits an electrical signal along a wire to an electronic controller, which directs separate actuators to apply or release the various friction elements to obtain a desired gear ratio. The control device is no longer necessarily in the form of a lever because the control device is no longer moving a mechanical connection for controlling the transmission. Instead, the control device is typically an electro-mechanical interface (e.g., a series of buttons, lever or knob) that is used to instruct the transmission to switch between the transmission ranges. An electronic display, powered by a battery on the vehicle, is typically employed to indicate the current range for the transmission and must be on, and thus drawing power, in order for the driver to know which range has been selected.

Many vehicles with a shift-by-wire transmission incorporate a "Return to Park" feature to automatically shift the transmission into Park when the driver exits the vehicle or the battery supplies a voltage below a certain threshold level. Automatically shifting the transmission into Park prevents unwanted motion of the vehicle. See, for example, U.S. Pat. Nos. 3,937,105, 4,892,014 and 7,156,218. Such a feature is activated when certain triggering events occur, for example, when the system detects a seat belt being unbuckled while a driver door is opened and the vehicle is essentially stationary, or when the ignition is turned off. Sensors or switches are typically used to detect the triggering events. When these sensors, which are preferably in the form of switches, fail, the "Return to Park" functions do not operate properly and in some cases the "Return to Park" functions are disabled. Some controllers that normally use sensor inputs to control a transmission will ignore a sensor that is known to be faulty and control the transmission based on the remaining sensors. For example, when the controller detects a faulty door sensor, the controller will ignore the door sensor and control the transmission based on a seatbelt sensor. The seatbelt sensor may be a hall sensor connected to a control system incorporating diagnostic routines that determine if the sensor is sending a faulty signal. However, in the case of a driver's door latch sensor used to determine if the driver's door is open, the sensor may have two valid states, i.e., door open or door closed. Since both states are valid, determining if the sensor has failed simply by looking at its state is not possible. If the switch fails and always sends a signal indicating that the door is closed, even when it is not, then the "Return to Park" feature becomes disabled.

Solving this problem is surprisingly difficult. Proposed solutions have proved to be ineffective or costly. For example, setting a door state within the controller to "indeterminate" until a signal is received from the door latch sensor indicating a transition from open to closed or vice versa may seem promising but causes unexpected problems. With such a system, a driver might be at car wash and turn off the engine to conserve fuel, which might also power off the controller, thus setting the door state to indeterminate and causing the controller to use only the seatbelt sensor. Then later, as the driver restarts the car and drives into the carwash and selects neutral, any unbuckling of the seatbelt will cause the "Return to Park" function to operate unexpectedly. Another proposed solution replaces the simple switch to one with inherent diagnostic capabilities. However, this solution uses an expensive switch and is thus undesirable.

As can be seen by the above discussion, there exists a need for a method and system for detecting a door state and door sensor failures that is cost effective and does not result in the transmission control system behaving in unexpected ways.

SUMMARY OF THE INVENTION

The present invention is directed to a system for determining failure in a door sensor. The system is preferably in a vehicle that has a driver's door that includes a door latch and a door lock. The door is equipped with a door latch sensor for sending a door state signal indicating if the door is open or closed. The door is also equipped with a door lock sensor for sending a door lock signal indicating if the door is locked or unlocked.

The vehicle preferably includes a shift-by-wire transmission including an automatic Return to Park feature that automatically shifts the transmission to Park based on the door state signal received from the door latch sensor. The Return to Park feature is configured to automatically shift the transmission to Park if the vehicle is traveling below a low set speed threshold, i.e., substantially stationary, upon detecting a triggering event, specifically a door state being open or indeterminate and a signal from a seatbelt sensor transitioning from indicating that the seatbelt is buckled to indicating that the seat belt is unbuckled; a signal from a seatbelt sensor indicating that the seatbelt is unbuckled or the sensor has failed and the door state transitioning from closed to open; or an ignition switch being turned off.

The system also includes a controller for executing a method for determining failure of the door latch sensor by receiving the door state signal from the door latch sensor, receiving the door lock signal from the door lock sensor, and determining from the door state signal and the door lock signal if the door latch sensor is faulty. If the door latch sensor is faulty, the controller adjusts the automatic Return to Park feature of the transmission so that the transmission shifts to Park based on the door lock signal instead of the door state signal. The controller includes a memory and is configured to initialize the memory to remember a state of the door to be "indeterminate". The controller is further configured to change the memory to remember the state of the door to be "closed" when the door latch signal indicates a transition from open to closed or the door lock signal indicates a transition from unlocked to locked. In addition, the controller changes the memory to remember the state of the door to be "open" when the door latch signal indicates a transition from closed to open or the door lock signal indicates a transition from locked to unlocked.

The controller is also configured to determine if the door latch is not functioning properly and, if so, mark the door latch signal as "faulty." The controller has a fault counter that tracks the door lock sensor. The controller is configured to send a lock command signal to the door lock; determine if the door lock signal indicates that the door lock has switched to a locked position; send an unlock command signal to the door lock; determine if the door lock signal indicates that the door lock has switched to an unlocked position; increase a fault counter when the lock or unlock command signal does not change the door to the locked or unlocked position respectively; and decrease the fault counter when the lock or unlock command signal does change the door to the locked or unlocked position respectively. The controller will set a fault flag when the fault counter exceeds a threshold value.

DETAILED DESCRIPTION OF PREFERRED EMBODIMENTS

Figure 1:
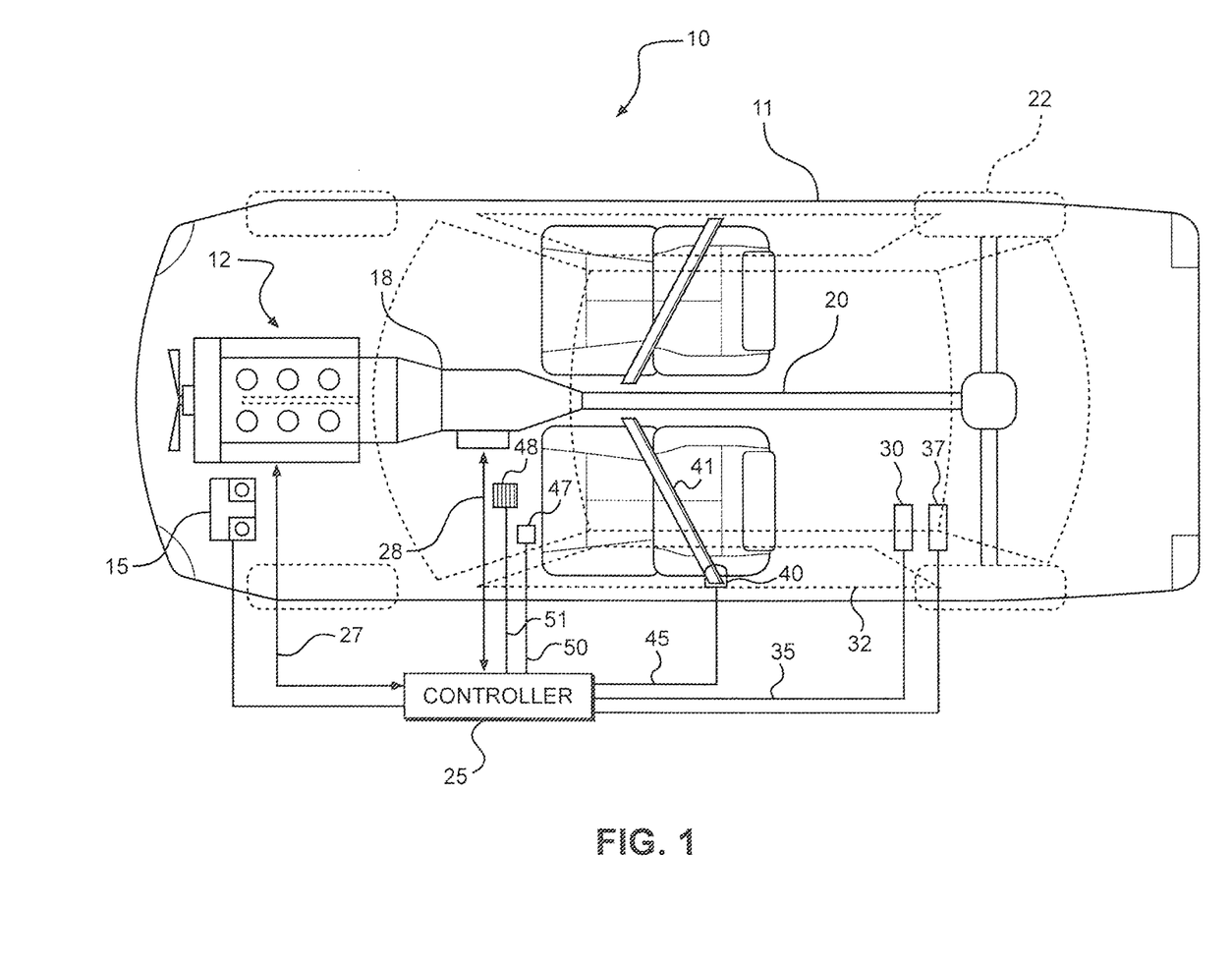
FIG. 1 is a diagram showing a vehicle incorporating a system for determining failure in a door sensor in accordance with the invention.

With initial reference to FIG. 1, there is shown an automotive vehicle 10 having a body 11 and an engine 12 with a battery 15. Power from engine 12 is transmitted to a transmission 18, then to the other portions of a powertrain 20 and eventually to drive wheels 22. Vehicle 10 is shown as a rear wheel drive vehicle but any type of powertrain arrangement, including front wheel or all wheel drive systems, could be employed. In addition, although engine 12 is shown as an internal combustion engine, other types of drive arrangements, including hybrid drive systems, could be utilized. A controller 25 is connected to engine 12 and transmission 18 by communication lines 27 and 28 respectively. Controller 25 uses inputs from several sources to obtain information used to control engine 12 and transmission 18. For example, controller 25 is connected to a driver door latch sensor 30, for determining if a door latch 31 of driver door 32 is open, by communication line 35 and a driver door lock sensor 37, for determining if a door lock 38 of driver door 32 is locked. A seat belt sensor 40 determines if a seat belt 41 is buckled or unbuckled and is also connected to controller 25 through a communication line 45. An ignition switch 47 and a brake sensor 48 are connected to controller 25 through lines 50 and 51 respectively.

Figure 2:
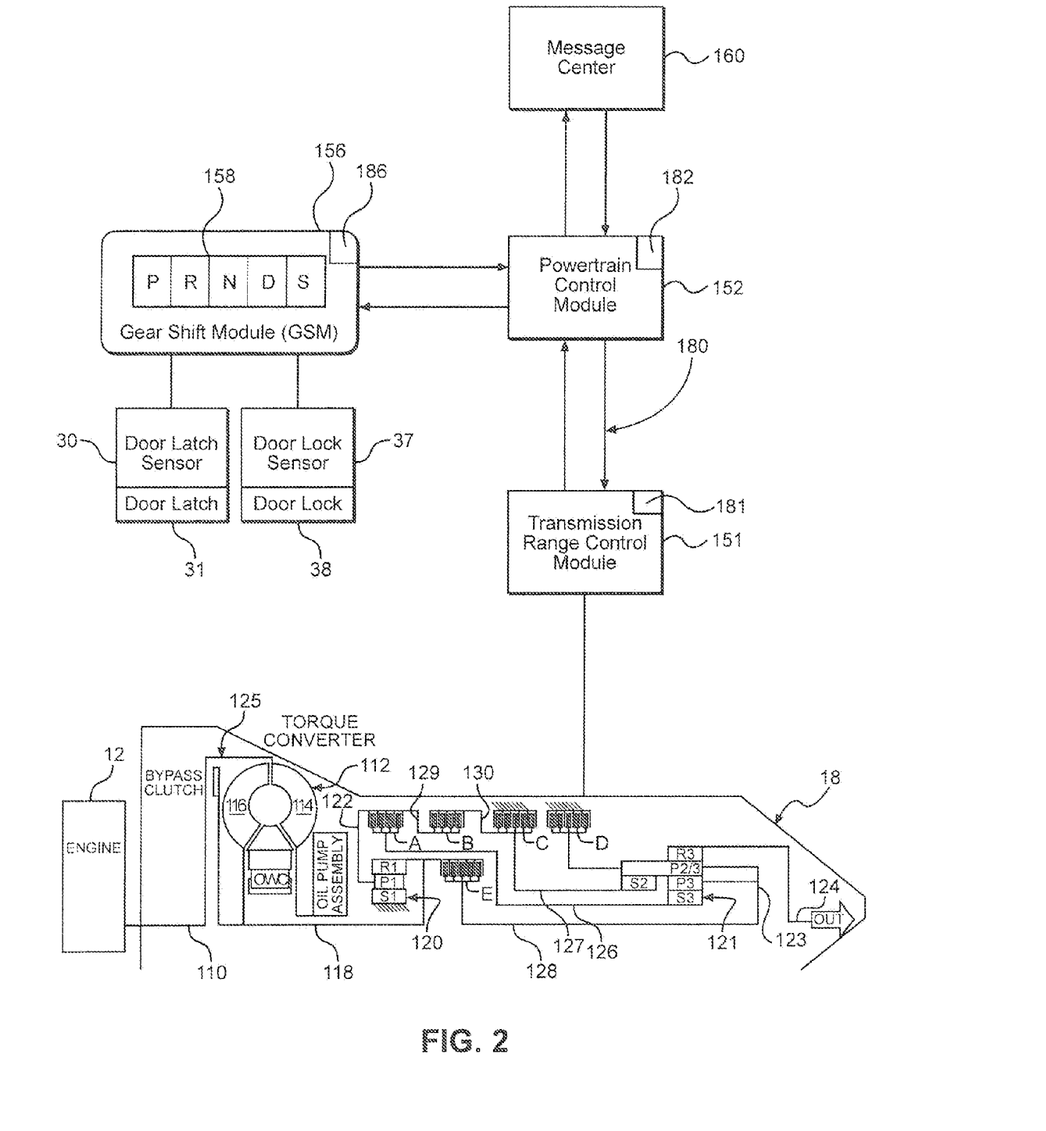
FIG. 2 is a basic schematic diagram of the system shown in FIG. 1.

FIG. 2 shows more details of transmission 18, which is an example of a multiple-ratio transmission wherein ratio changes are controlled by friction elements acting on individual gear elements. While a preferred example is disclosed, numerous different types of transmission could be employed. Engine torque from engine 12 is distributed to torque input element 110 of hydrokinetic torque converter 112. An impeller 114 of torque converter 112 develops turbine torque on a turbine 116 in a known fashion. Turbine torque is distributed to a turbine shaft, which is also transmission input shaft 118. Transmission 18 is shown to include a simple planetary gearset 120 and a compound planetary gearset 121. Gearset 120 has a permanently fixed sun gear S1, a ring gear R1 and planetary pinions P1 rotatably supported on a carrier 122. Transmission input shaft 118 is drivably connected to ring gear R1. Compound planetary gearset 121, sometimes referred to as a Ravagineaux gearset, has a small pitch diameter sun gear S3, a torque output ring gear R3, a large pitch diameter sun gear S2 and compound planetary pinions. The compound planetary pinions include long pinions P2/3, which drivably engage short planetary pinions P3 and torque output ring gear R3. Long planetary pinions P2/3 also drivably engage short planetary pinions P3. Short planetary pinions P3 further engage sun gear S3. Planetary pinions P 2/3, P3 of gearset 21 are rotatably supported on compound carrier 123. Ring gear R3 is drivably connected to a torque output shaft 124, which is drivably connected to vehicle traction wheels 22 through powertrain 20 shown in FIG. 1. Gearset 120 is an underdrive ratio gearset arranged in series with respect to compound gearset 121. Typically, transmission 18 preferably includes a lockup or torque converter bypass clutch, as shown at 125, to directly connect transmission input shaft 118 to engine 12 after a torque converter torque multiplication mode is completed and a hydrokinetic coupling mode begins.

FIG. 2 also shows a Transmission Range Control Module 151, a Powertrain Control Module 152 and a Gear Shift Module 156 that collectively define part of controller 25.

Transmission Range Control Module 151 is connected to transmission 18 by a shift cable (not labeled), rather than transmission 18 being connected directly to a driver operated mechanical shifter. A transmission control mechanism, such as Gear Shift Module 156, is provided to select a transmission shift range. One possible implementation would be various buttons 158, each representing a different transmission range. In this type of implementation, Gear Shift Module 156 is used to select several ranges, such as Park where the transmission output is locked to prevent the vehicle from moving, Neutral where the transmission allows vehicle 10 to be moved freely, such as when being towed, Reverse where transmission 18 allows the vehicle to move backwards, and one or more Drive ranges that enable forward motion of the vehicle. Gear Shift Module 156 is also shown to include a Sport range. The Sport range is similar to the Drive range but will cause transmission 18 to shift forward ratios based on inputs from upshift and downshift switches (not shown) actuated by the driver. Gear Shift Module buttons 158 are labeled with letters generally corresponding to the several transmission ranges "P", "R", "N", "D", and "S" as shown in FIG. 2. Once transmission 18 has entered one of the ranges, a message center 160 shows the driver which range was entered. Each of the control modules 151, 152 and 156 is connected to a local communication network generally indicated at 180 and has a respective non-volatile memory 181, 182, 186.

The Park range can preferably be entered in many ways. In particular, the driver can select Park by pushing the "P" button to cause the Powertrain Control Module 152 to check to see if vehicle 10 is traveling below an extremely low speed (essentially stationary) and, if so, instructs Transmission Range Control Module 151 to shift transmission 18 into Park. Alternatively, controller 25 may respond to a triggering event. For example, when driver ignition switch 47 is turned to an off position, Powertrain Control Module 152 automatically instructs Transmission Range Control Module 151 to shift transmission 18 into Park, thus enabling a "Return to Park" feature. Similarly, when the driver opens door 32 after unbuckling belt 41, sensors 30 and 40, if working properly, will signal Powertrain Control Module 152 which automatically instructs Transmission Range Control Module 151 to shift transmission 18 into Park, thus once again enabling a "Return to Park" feature. The Reverse range is entered by pushing the button labeled "R", at which point Powertrain Control Module 152 automatically instructs Transmission Range Control Module 151 to shift transmission 18 into Reverse, thus enabling vehicle 10 to move backward. In the exemplary transmission embodiment shown, the Reverse range is established by applying low-and-reverse brake D and friction element B. The Neutral range is entered by a single push of the "N" button on Gear Shift Module 156 or by a push of the "P" button when vehicle 10 is traveling too fast to safely enter the Park mode. In either case, Powertrain Control Module 152 instructs Transmission Range Control Module 151 to shift transmission 18 into Neutral and transmission 18 allows wheels 22 to rotate freely.

The Drive or Sport ranges are entered by a single push of the "D" or "S" buttons respectively. Optionally, a Low or "L" range (not shown) can be made available to keep transmission 18 in low gears during forward motion of vehicle 10. When in Drive, in the exemplary transmission shown, during operation in the first four forward driving ratios, carrier P1 is drivably connected to sun gear S3 through shaft 126 and forward friction element A. During operation in the third ratio, and fifth ratio, direct friction element B drivably connects carrier 22 to shaft 127, which is connected to large pitch diameter sun gear S2. During operation in the fourth, fifth and sixth forward driving ratios, overdrive friction element E connects turbine shaft 118 to compound carrier 123 through shaft 128. Friction element C acts as a reaction brake for sun gear S2 during operation in second and sixth forward driving ratios. During operation of the third forward driving ratio, direct friction element B is applied together with forward friction element A. The elements of gearset 121 then are locked together to effect a direct driving connection between shaft 128 and output shaft 126. The torque output side of forward friction element A is connected through torque transfer element 129 to the torque input side of direct friction element B during forward drive. The torque output side of direct friction element B, during forward drive, is connected to shaft 127 through torque transfer element 130. More details of this exemplary type of transmission arrangement are found in U.S. Pat. No. 7,216,025, which is hereby incorporated by reference.

Figure 3:
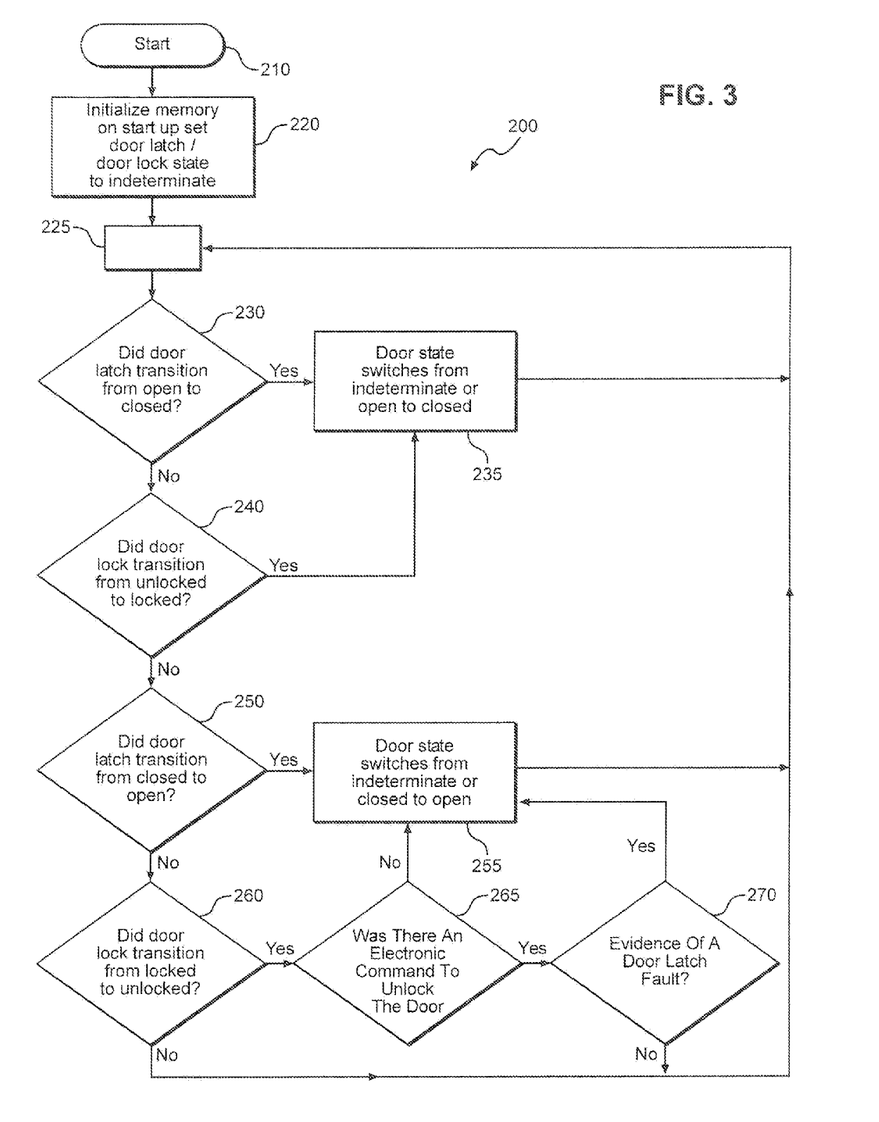
FIG. 3 is a flowchart showing part of a control routine employed in the system of FIG. 1 used to determine door sensor failure.

FIG. 3 is a flow chart showing a preferred method 200 of determining if door latch sensor 30 and door lock sensor 37 are functioning properly, which is implemented by controller 25, and starts at step 210. Next at step 220, controller 25 initializes memory 186 on start up and sets both a door latch state and a door lock state to "indeterminate." Preferably, the states of door latch 31 and door lock 38 are remembered by storing information about remembered states in memory 186 of Gear Shift Module 156 but the state information may also be stored in memory 181 or 182 of Transmission Range Control Module 151 or Powertrain Control Module 152. Controller 25 then waits at step 225 for signals from door latch sensor 30 and door lock sensor 37 to determine how to change the remembered state. If door latch 31 transitions from unlocked to locked at step 230, the door state is switched from "indeterminate" or "open" to "closed" at step 235. If the answer at step 230 is "No", controller 25 proceeds to step 240. If door lock 38 transitions from unlocked to locked at step 240, the door state is switched from "indeterminate" or "open" to "closed" at step 235. If the answer at step 240 is "No", controller 25 proceeds to step 250. If door latch 31 transitions from "closed" to "open" at step 250, the door state is switched from "indeterminate" or "closed" to "open" at step 255. If the answer at step 250 is "No", controller 25 proceeds to step 260. If door lock 38 transitions from locked to unlocked at step 260, controller 25 proceeds to step 265 and checks to see if there was an electronic command to unlock door 32. If not the door state is switched from "indeterminate" or "closed" to "open" at step 255. If the answer at step 265 is yes then controller 25 checks for evidence of a door latch fault at step 270. If there is no evidence controller 25 goes to step 225, if there is evidence controller 25 goes to step 235. If the answer at step 260 is "No", controller 25 returns to step 225. After steps 235 and 255, controller 25 returns to wait for the next signal at step 225.

Figure 4:
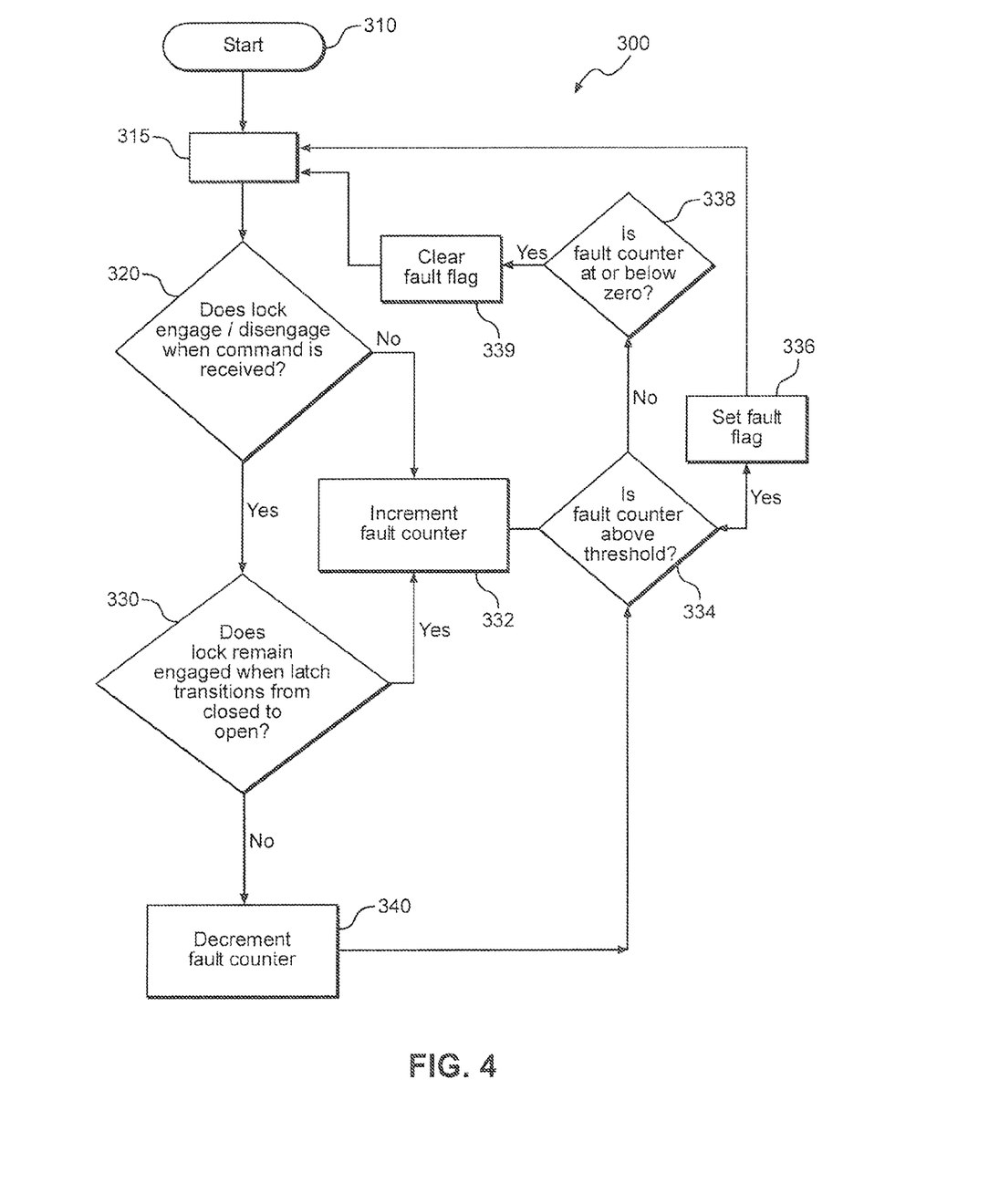
FIG. 4 is a flowchart showing another part of the control routine employed used to determine door sensor failure.

FIG. 4 is a flow chart showing more details of a strategy for setting a fault flag to indicate a failed door latch sensor. Controller 25 starts at step 310 and proceeds to step 315 to wait until a lock engage or disengage command is sensed at step 320 or door 32 opens as sensed by latch 31 transitioning from closed to open at step 330. If door lock 38 does not engage or disengage as door lock 38 should do when the command is received then controller 25 increments a fault counter at step 332. Similarly, if door lock 38 does not disengage when door 32 is opened manually at step 330 then the fault counter is incremented at step 332. Specifically, controller 25 determines if door lock 38 remains engaged when door latch 31 transitions from closed to open. After step 332, controller 25 determines if the fault counter is above a threshold and, if so, a fault flag is set at step 336. Otherwise, the fault counter is checked to determine if the counter is below zero at step 338, in which case the fault flag is cleared at step 339. However, if door lock 38 functions properly at steps 320 and 330, the fault counter is decremented at step 340 and controller 25 proceeds to step 334. From method 200 set forth in FIG. 3, controller 25 has a method to determine a door state from two sensors 30, 37 and, from strategy 300 set forth in FIG. 4, controller 25 knows when door latch sensor 30 is not functioning properly. With this information, controller 25 will be able to assuredly perform controller features that require a door state signal even if one door sensor 30, 37 fails.

Figure 5:
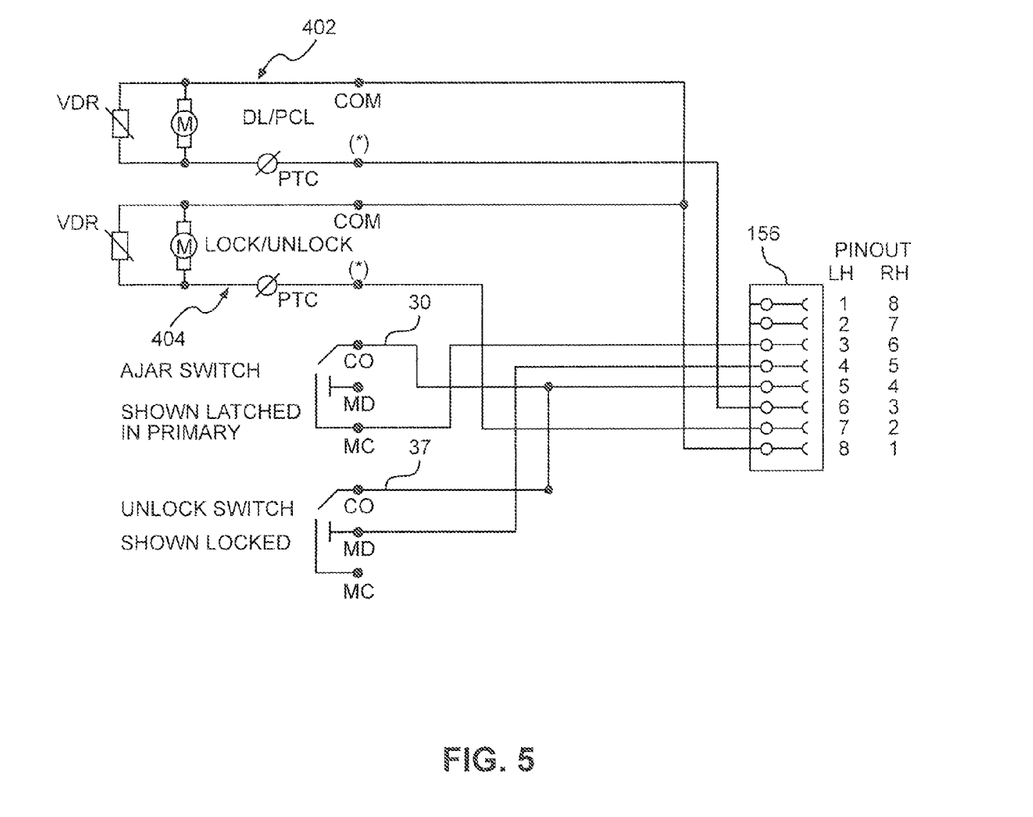
FIG. 5 is an electrical schematic of wiring extending from the door sensors.
Figure 6:
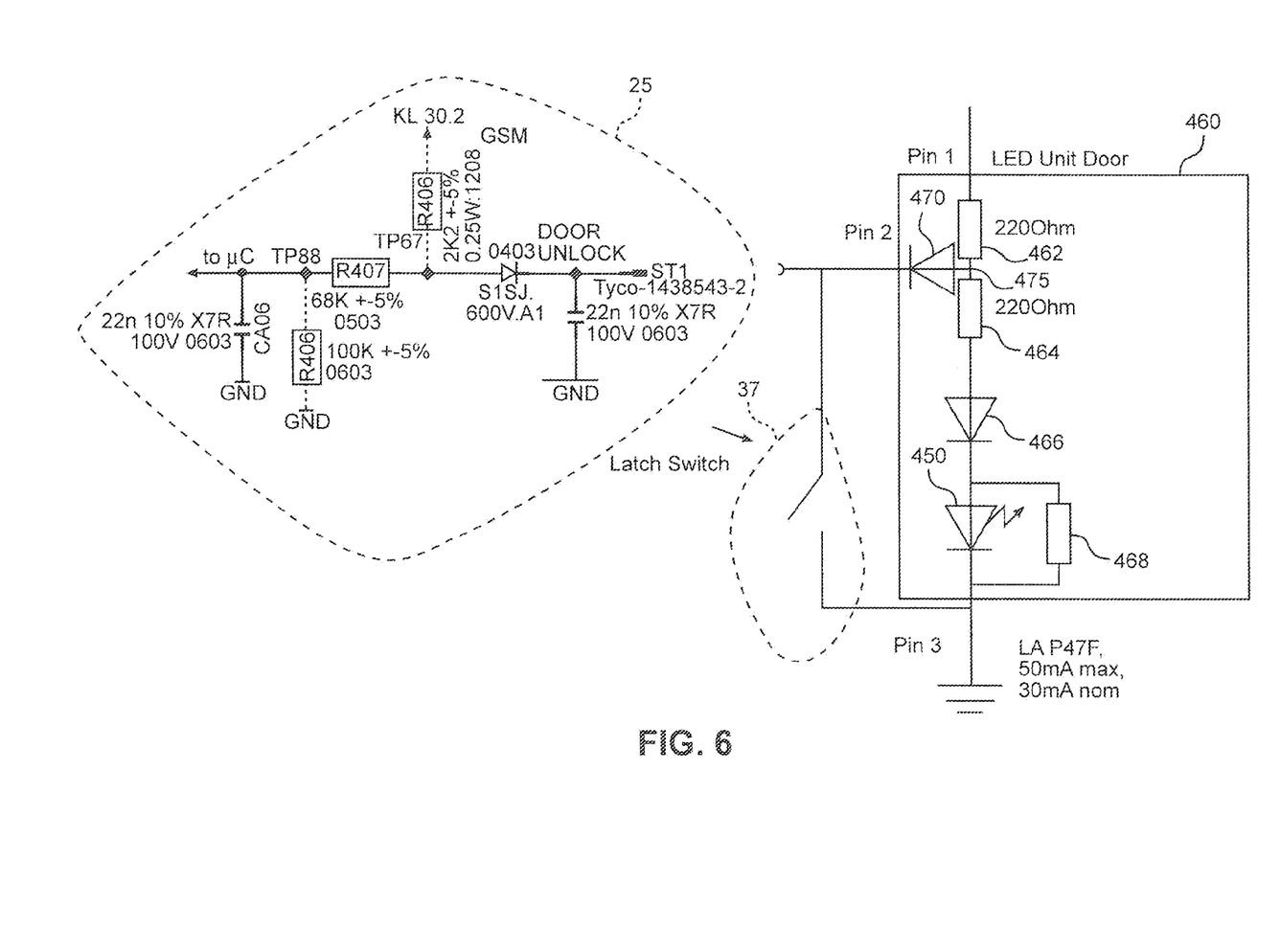
FIG. 6 is a detailed view of a door sensor of FIG. 1 incorporating a light emitting diode.

FIG. 5 is a wiring diagram showing the connection between controller 25 and both a door latch operator 402 and a door lock operator 404. Commands to door lock operator 404 are sensed, as before, leaving controller 25. Controller 25 is also connected to door latch sensor 30 and door lock sensor 37. FIG. 6 shows an embodiment where the state of door lock 38 is signaled by an LED 450 rather than the position of a sensor. In this case, a housing 460 receives current through a pin 1 that travels through two resistors 467, 464, a diode 466 and then LED 450 to an electrical source at pin 3. A resistor 468 in parallel with LED 450 reduces the current traveling though LED 450 when LED 450 is lit, signaling that door is locked. Door lock sensor 37 is connected between pins 3 and 2. Controller 25 is connected to pin 2 and through a diode 470 to a line 475 between two resistors 462, 464. Diode 470 enables controller 25 to sense the position of door lock 38 without lighting up LED 450 at the wrong time.

Although described with reference to preferred embodiments of the invention, it should be readily understood that various changes and/or modifications could be made to the invention without departing from the spirit thereof. For instance, the system functions with manual or electronic locks and the controller features using this system do not need to be limited to Return to Park feature but could also include other features such as a feature that automatically stops and starts the engine to save fuel. In general, the invention is only intended to be limited by the scope of the following claims.

The invention claimed is:

1. In a vehicle including a door, a door latch sensor, a door lock sensor, a shift-by-wire transmission and a controller, a method for performing a controller feature comprising:
   determining failure in the door latch sensor including receiving a door state signal from the door latch sensor, receiving a door lock signal from the door lock sensor, and determining, based on inconsistencies in the door state signal and the door lock signal, if the door latch sensor is faulty
   determining a door state based on the door state signal when the door latch sensor is not faulty and based on the door lock signal and not the door state signal when the door latch sensor is faulty; and
   performing the controller feature based on the door state.

2. The method of claim 1, further comprising:
   initializing a first memory for remembering the door state to be indeterminate.

3. The method of claim 2, further comprising:
   changing the first memory to remember the door state to be closed when the door state signal indicates a transition from open to closed or the door lock signal indicates a transition from unlocked to locked.

4. The method of claim 2, further comprising:
   changing the first memory to remember the door state to be open when the door state signal indicates a transition from closed to open or the door lock signal indicates a transition from locked to unlocked.

5. The method of claim 1, further comprising:
   sending a lock command signal to a door lock;
   determining if the door lock signal indicates that the door lock has switched to a locked position;
   sending an unlock command signal to the door lock;
   determining if the door lock signal indicates that the door lock has switched to an unlocked position;
   increasing a fault counter when the lock or unlock command signal does not change the door lock to the locked or unlocked position respectively; and
   decreasing the fault counter when the lock or unlock command signal does change the door lock to the locked or unlocked position respectively.

6. The method of claim 5, further comprising: setting a fault flag when the fault counter exceeds a threshold value.

7. The method of claim 1, wherein the controller feature automatically shifts the transmission to Park if the vehicle is traveling below a low set speed threshold upon detecting a triggering event.

8. The method of claim 7, wherein the triggering event is selected from at least one of: the door state is open or indeterminate and a signal from a seat-belt sensor transitions from indicating that a seatbelt is buckled to indicating that the seat-belt is unbuckled; a signal from the seatbelt sensor indicates that the seatbelt is unbuckled and the door state transitions from closed to open; the seatbelt sensor has failed and the door state transitions from closed to open; and an ignition switch has been turned off.

9. A system performing a controller feature comprising:
   a vehicle including, a shift-by-wire transmission, a controller and a door having a door latch and a door lock;
   a door latch sensor for sending a door state signal indicating if the door is open or closed;
   a door lock sensor for sending a door lock signal indicating if the door is locked or unlocked; and
   a controller configured to: determine failure in the door latch sensor by receiving the door state signal from the door latch sensor, receiving a door lock signal from the door lock sensor, and determining, based on inconsistencies in the door state signal and the door lock signal, if the door latch sensor is faulty; determine a door state based on the door state signal when the door latch sensor is not faulty and based on the door lock signal and not the door state signal when the door latch sensor is faulty; and perform the controller feature based on the door state.

10. The system of claim 9, wherein the controller includes a first memory and is configured to initialize the first memory to remember the door state to be indeterminate.

11. The system of claim 10, wherein the controller is further configured to change the first memory to remember the door state to be closed when the door state signal indicates a transition from open to closed or the door lock signal indicates a transition from unlocked to locked.

12. The system of claim 10, wherein the controller is further configured to change the first memory to remember the door state to be open when the door state signal indicates a transition from closed to open or the door lock signal indicates a transition from locked to unlocked.

13. The system of claim 9, wherein the controller is configured to
   send a lock command signal to the door lock;
   determine if the door lock signal indicates that the door lock has switched to a locked position;
   send an unlock command signal to the door lock;
   determine if the door lock signal indicates that the door lock has switched to an unlocked position;

increase a fault counter when the lock or unlock command signal does not change the door lock to the locked or unlocked position respectively; and decrease the fault counter when the lock or unlock command signal does change the door lock to the locked or unlocked position respectively.

14. The system of claim 13, wherein the controller is configured to set a fault flag when the fault counter exceeds a threshold value.

15. The system of claim 13, wherein the controller is configured to determine if the door state signal is faulty by counting how many times the door state signal indicates the door being opened or closed and determining if the number of times exceeds a threshold.

16. The system of claim 9, wherein the controller feature is configured to automatically shift a transmission to Park if the vehicle is traveling below a low set speed threshold upon detecting a triggering event.

17. The system of claim 16, wherein the triggering event is selected from at least one of: the door state is open or indeterminate and a signal from a seatbelt sensor transitions from indicating that a seatbelt is buckled to indicating that the seat-belt is unbuckled; a signal from the seatbelt sensor indicates that the seatbelt is unbuckled and the door state transitions from closed to open; the seatbelt sensor has failed and the door state transitions from closed to open; or an ignition switch has been turned off.

* * * * *